(12) United States Patent
Tanabe

(10) Patent No.: US 10,507,871 B2
(45) Date of Patent: Dec. 17, 2019

(54) VEHICLE REAR PORTION STRUCTURE

(71) Applicant: TOYOTA JIDOSHA KABUSHIKI KAISHA, Toyota-shi, Aichi-ken (JP)

(72) Inventor: Daisuke Tanabe, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/959,520

(22) Filed: Apr. 23, 2018

(65) Prior Publication Data

US 2018/0312201 A1 Nov. 1, 2018

(30) Foreign Application Priority Data

Apr. 28, 2017 (JP) ................................. 2017-090358
Dec. 27, 2017 (JP) ................................. 2017-251734

(51) Int. Cl.
*B62D 25/18* (2006.01)
*B62D 25/02* (2006.01)
*B62D 25/04* (2006.01)

(52) U.S. Cl.
CPC ............. *B62D 25/18* (2013.01); *B62D 25/02* (2013.01); *B62D 25/04* (2013.01)

(58) Field of Classification Search
CPC ...... B62D 25/18; B62D 25/16; B62D 29/043; B62D 25/04; B62D 25/02
USPC ........ 296/193.06, 203.03, 30, 191, 198, 208
See application file for complete search history.

(56) References Cited

U.S. PATENT DOCUMENTS

| 6,619,729 B2* | 9/2003 | Kimura .................. B60J 5/0477 296/203.01 |
| 2016/0121936 A1 | 5/2016 | Patberg et al. |
| 2016/0251038 A1* | 9/2016 | Kawata ............... B62D 25/087 296/190.08 |
| 2016/0297481 A1 | 10/2016 | Yokoi |
| 2017/0267290 A1* | 9/2017 | Ayuzawa ............... B62D 25/04 |

FOREIGN PATENT DOCUMENTS

| DE | 102013106070 B3 | 7/2014 |
| EP | 2872377 | 5/2015 |
| JP | 5377047 B2 | 12/2013 |
| JP | 2015-113083 A | 6/2015 |
| WO | 2014/009271 A1 | 1/2014 |

* cited by examiner

*Primary Examiner* — Jason S Morrow
*Assistant Examiner* — E Turner Hicks
(74) *Attorney, Agent, or Firm* — Oliff PLC

(57) ABSTRACT

A vehicle rear portion structure includes a rear pillar, a framework member, a barrier wall and a side panel. The rear pillar extends in the vehicle vertical direction. The framework member is joined to an upper portion of the rear pillar and extends in the vehicle front-and-rear direction. The barrier wall is at the vehicle inner side of the rear pillar, and is joined to the rear pillar and the framework member to be watertight. The barrier wall divides the vehicle inner side from the vehicle outer side thereof. The side panel is provided at the vehicle outer side of the rear pillar, the framework member and the barrier wall. The side panel structures a design surface of a vehicle side portion.

7 Claims, 5 Drawing Sheets

VEHICLE REAR PORTION STRUCTURE

CROSS-REFERENCE TO RELATED APPLICATION

This application claims priority under 35 USC 119 from Japanese Patent application No. 2017-090358 filed on Apr. 28, 2017, and Japanese Patent application No. 2017-251734 filed on Dec. 27, 2017, the disclosures of which are incorporated by reference herein in their entirety.

BACKGROUND

Technical Field

The present disclosure relates to a vehicle rear portion structure.

Related Art

A structure has been disclosed (see Japanese Patent Application Laid-Open (JP-A) No. 2015-113083) in which, in a vehicle rear portion structure, a roof side inner panel is disposed between a second quarter pillar and a wheel house. A further structure has been disclosed (see Japanese Patent No. 5,377,047) in which, as a structure that prevents tilting of a rear pillar and supports a load from a rear damper, a rear pillar gusset spans between a damper base and a roof side rail, and a stiffener spans between a wheel house and the roof side rail.

Heretofore, however, a side panel fabricated of metal that constitutes a design surface of a vehicle has acted as a barrier wall dividing the vehicle inside from the vehicle outside. Thus, it has been necessary to seal seams between the side panel and other members to assure watertightness. Moreover, because the side panel and a member such as a roof side inner panel or the like form a two-layer structure of metal members, reducing vehicle weight has been difficult. A side panel fabricated of metal that constitutes a design surface of a vehicle contributes very little to improving stiffness of the vehicle. Meanwhile, around a rear wheel house of a vehicle, vehicle framework portions relating to stiffness at the vehicle inner side of a side panel are separate from one another except at joining portions where framework members are joined to one another. Consequently, the vehicle framework portions are vulnerable to effects of twisting of the vehicle, vertical and left-and-right deformations, and the like. Accordingly, improvements in stiffness around a rear wheel house are desired.

SUMMARY

The present disclosure enables both a reduction in weight of a vehicle and an assurance of stiffness.

A vehicle rear portion structure according to a first aspect includes (i) a rear pillar extending in a vehicle vertical direction, (ii) a framework member that is joined to an upper portion of the rear pillar and extends in a vehicle front-and-rear direction, (iii) a barrier wall at a vehicle inner side of the rear pillar, the barrier wall being joined to the rear pillar and the framework member so as to be watertight, and the barrier wall dividing the vehicle inner side from the vehicle outer side, and (iv) a side panel provided at the vehicle outer side of the rear pillar, the framework member and the barrier wall, the side panel structuring a design surface of a vehicle side portion.

According to the first aspect described above, at the vehicle inner side of the rear pillar, the barrier wall is joined, to be watertight, to the rear pillar and the framework member extending in the vehicle front-and-rear direction. Thus, the barrier wall divides the vehicle inside from the outside. Because watertightness of the barrier wall is assured, there is no need to assure water tightness of the side panel structuring a design surface of the vehicle side portion, and a material of the side pillar is not limited to being a metal.

Furthermore, a shear panel (a load-bearing wall) is formed by joining the barrier wall to the rear pillar and the framework member extending in the vehicle front-and-rear direction. Therefore, stiffness of the vehicle is improved.

In a second aspect, in the vehicle rear portion structure according to the first aspect, the side panel is a resin member.

According to the second aspect described above, because the side panel is a resin member, the vehicle may be reduced in weight and formability is improved compared to cases in which a metal member is employed.

In a third aspect, in the vehicle rear portion structure according to the first aspect or the second aspect, an aperture is formed by the rear pillar, the framework member, a rear floor and a rear wheel house. The aperture is closed off by the barrier wall.

According to the third aspect described above, because the aperture formed by the rear pillar, the framework member, the rear floor and the rear wheel house is closed off by the barrier wall, the barrier wall operates as a load-bearing wall and further improves stiffness of the vehicle.

In a fourth aspect, in the vehicle rear portion structure according to any one of the first to third aspects, a recess-shaped inlet box portion is provided at the side panel, and an inlet portion is provided at the inlet box portion.

The meaning of the term "inlet portion" is intended to encompass a region through which an energy source of the vehicle is supplied, such as a filler inlet, an electricity receiving portion to which a charging cable is to be connected, or the like. According to the fourth aspect described above, because the watertightness of the barrier wall is assured as described above, there is no need to assure watertightness of the side panel structuring the design surface of the vehicle side portion. Because the recess-shaped inlet box portion is provided at the side panel and the inlet portion is provided at the inlet box portion, there is no need to assure watertightness between the side panel and the inlet box portion, or between the inlet box portion and the inlet portion. In other words, sealing structures for assuring watertightness of the inlet portion surroundings are unnecessary. Therefore, structures may be simplified.

In a fifth aspect, in the vehicle rear portion structure according to the fourth aspect, the side panel and the inlet box portion are formed integrally.

According to the fifth aspect described above, because the side panel and the inlet box portion are formed integrally, structures may be further simplified compared to a case in which the inlet box portion is a separate body and is assembled to the side panel.

In a sixth aspect, in the vehicle rear portion structure according to the fourth aspect or the fifth aspect, the side panel, the inlet box portion and the inlet portion are each constituted of resin.

According to the sixth aspect described above, a load transmitted from the side panel and the inlet box portion to the inlet portion during a collision at the vehicle rear portion is suppressed compared to a case in which the side panel, the inlet box portion and the inlet portion are each fabricated of metal.

In a seventh aspect, in the vehicle rear portion structure according to the sixth aspect, the side panel, the inlet box portion and the inlet portion are formed integrally of resin.

According to the seventh aspect described above, because the inlet portion is integrally formed of resin in addition to the side panel and the inlet box portion, the number of components is reduced and structures are further simplified.

According to the vehicle rear portion structure according to the first aspect, both a reduction in weight of the vehicle and an assurance of stiffness may be achieved.

According to the vehicle rear portion structure according to the second aspect, freedom of design of the side panel may be improved even while the vehicle is reduced in weight.

According to the vehicle rear portion structure according to the third aspect, stiffness of the vehicle may be further improved.

According to the vehicle rear portion structure according to the fourth aspect, a further reduction in weight of the vehicle and an elimination of assembly steps are enabled.

According to the vehicle rear portion structure according to the fifth aspect, the vehicle may be still further reduced in weight.

According to the vehicle rear portion structure according to the sixth aspect, excessive deformation of a filler pipe, a high-voltage cable or the like during a collision at the vehicle rear portion may be inhibited.

According to the vehicle rear portion structure according to the seventh aspect, assembly steps of the vehicle may be further eliminated.

BRIEF DESCRIPTION OF THE DRAWINGS

Exemplary embodiments of the present disclosure will be described in detail based on the following figures, wherein.

DETAILED DESCRIPTION

Figure 1:
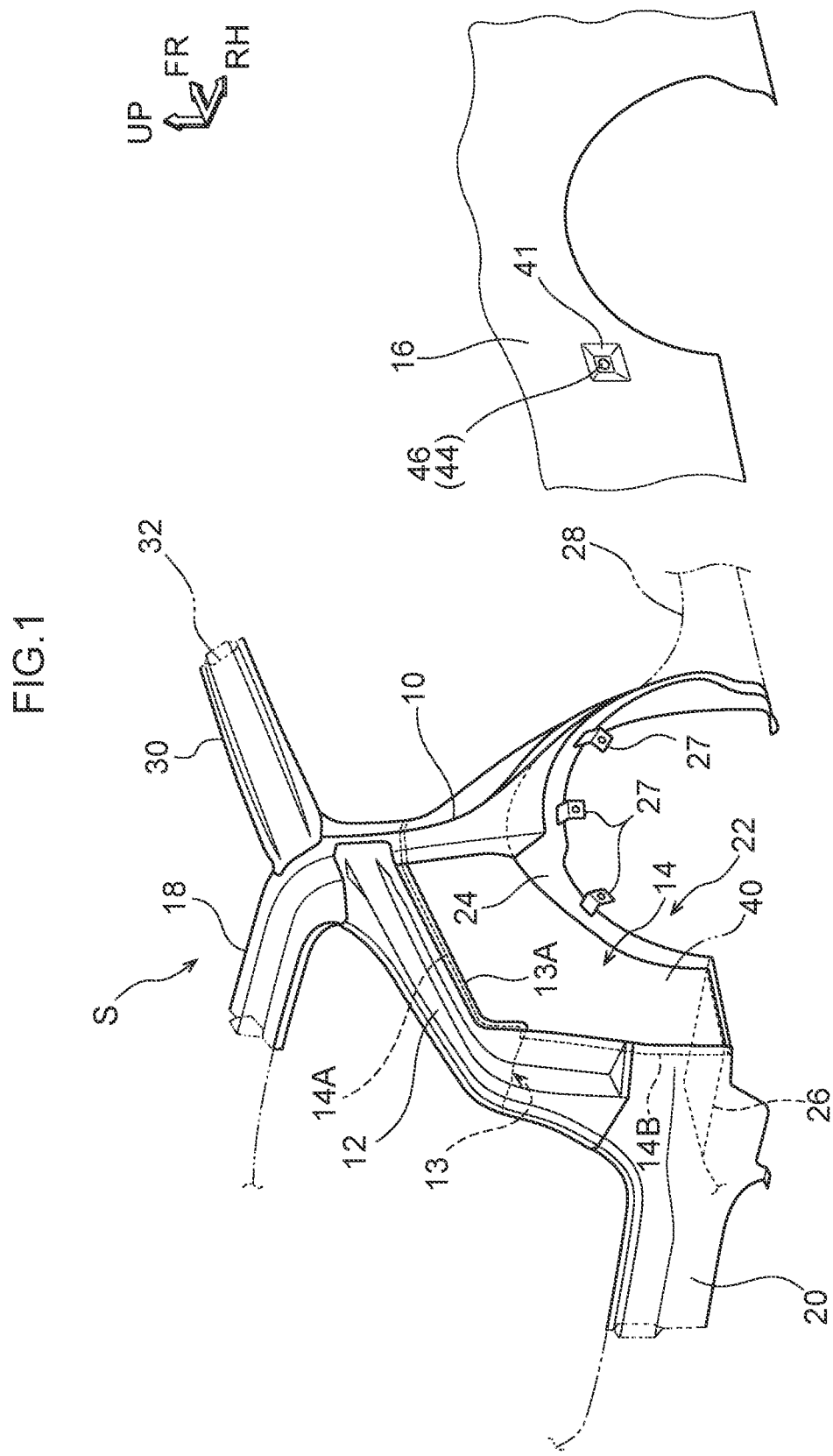
FIG. 1 is an exploded perspective view showing a vehicle rear portion structure according to a first exemplary embodiment.

Herebelow, exemplary embodiments of the present disclosure are described in accordance with the drawings. In the drawings, the arrow FR indicates a vehicle front, the arrow UP indicates a vehicle upper side, the arrow RH indicates a vehicle right side, and the arrow OUT indicates the vehicle width direction outer side.

First Exemplary Embodiment

Figure 2:
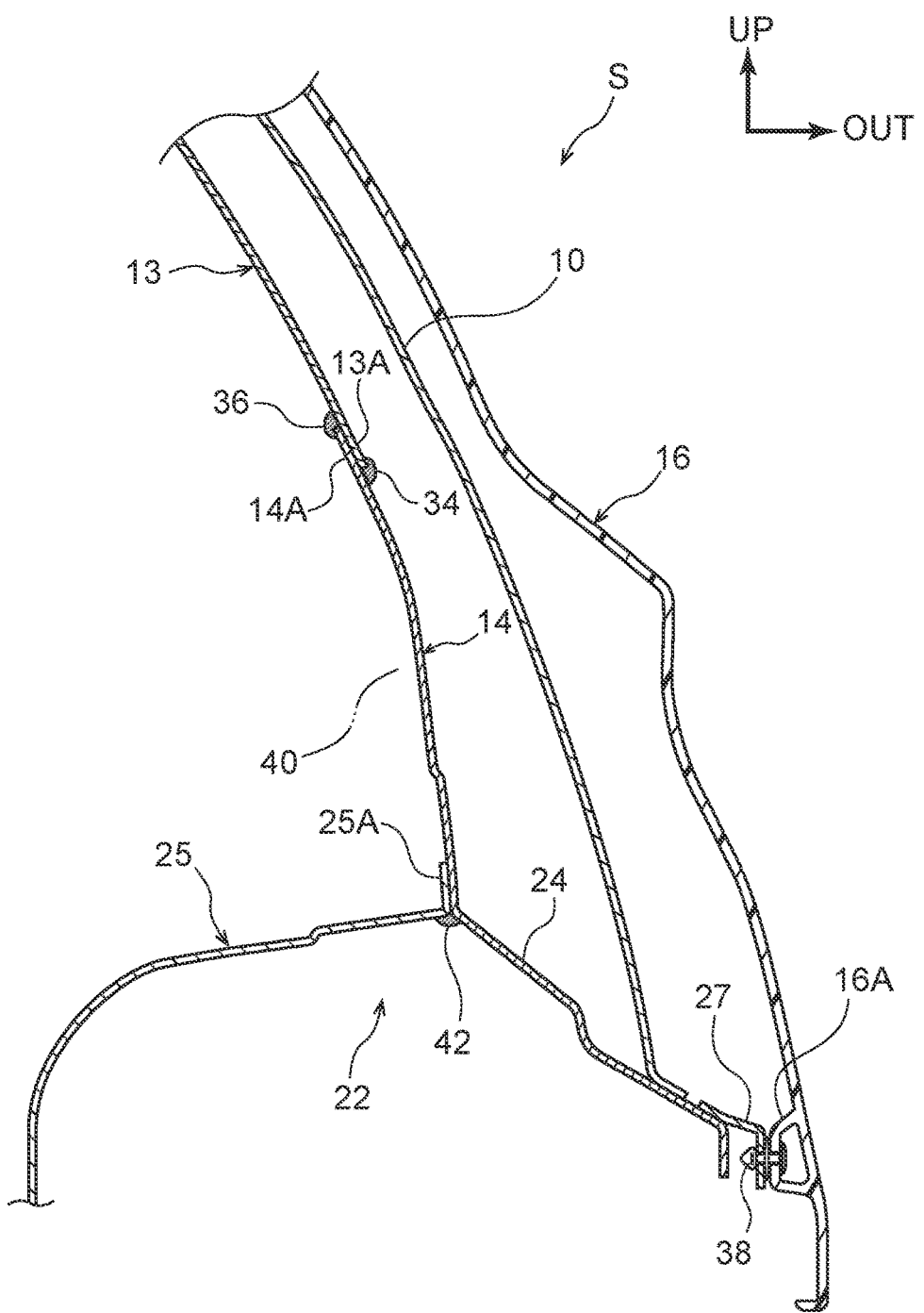
FIG. 2 is a sectional diagram in a case in which a position of a pillar in FIG. 1, relating to the vehicle rear portion structure according to the first exemplary embodiment, is cut in the vehicle vertical direction.

In FIG. 1 and FIG. 2, a vehicle rear portion structure S according to the present exemplary embodiment includes a rear pillar 10, a trough reinforcement 12, a roof side inner panel 13, a barrier wall 14, and a side panel 16. The trough reinforcement 12 and roof side inner panel 13 serve as examples of framework members.

The rear pillar 10 is, for example, a framework member that extends in the vehicle vertical direction at the vehicle rear portion. The upper end of the rear pillar 10 is joined to a rear header 18 that extends in the vehicle width direction. The rear pillar 10 is also joined to and an outer panel 24 of a rear wheel house 22. The lower end of the rear pillar 10 may be extended and joined to a rocker 28. The rocker 28 is a framework member that extends in the vehicle front-and-rear direction at a lower portion of a vehicle side portion.

The rear wheel house 22 is configured by the outer panel 24 and an inner panel 25 being joined together, and is provided at the vehicle rear side of the rocker 28. A flange portion 25A of the inner panel 25 is joined to the outer panel 24. The flange portion 25A and outer panel 24 are sealed together by a sealant 42, assuring watertightness. As an example, clip-fitting portions 27 for retaining the side panel 16 with clips are provided at the outer panel 24. Positions and numbers of the clip-fitting portions 27 are not limited by the example shown in the drawings. The clip-fitting portions 27 may also be provided at other locations, such as the rear pillar 10, the barrier wall 14 and the like.

The rear pillar 10 is not limited to being an integrally formed structure but may be a divided structure in which rear pillar members that are plurally divided in the vehicle vertical direction (not shown in the drawings) are joined to one another using means such as bolt-fastening, rivet-joining or the like. A region extending from the rear pillar 10 to the rear header 18 may be configured integrally.

The trough reinforcement 12 is joined to an upper portion of the rear pillar 10 and extends in the vehicle front-and-rear direction. To be specific, a front end portion of the trough reinforcement 12 is joined to the upper portion of the rear pillar 10. The roof side inner panel 13 is disposed, for example, at the vehicle inner side of the rear pillar 10 and the trough reinforcement 12, and is joined to the rear pillar 10 and the trough reinforcement 12. A closed cross section is formed between the roof side inner panel 13 and the trough reinforcement 12, and a closed cross section is formed between the roof side inner panel 13 and the rear pillar 10.

A rear portion of the trough reinforcement 12 extends toward the vehicle lower side and is joined to a lower back panel 20. A rear floor 26 is provided between the lower back panel 20 and the rear wheel house 22.

A roof side reinforcement 30 is joined to the vehicle front side of an upper portion of the rear pillar 10. The roof side reinforcement 30 extends in the vehicle front-and-rear direction and is joined to a roof side inner panel 32, forming a closed cross section. A roof side outer panel (not shown in the drawings) is joined to the vehicle width direction outer side of the roof side reinforcement 30.

The barrier wall 14 is joined, to be watertight, to the rear pillar 10 and roof side inner panel 13 at the vehicle inner side of the rear pillar 10. The barrier wall 14 divides the vehicle inside from the vehicle outside. To be specific, the barrier wall 14 is an upright wall portion provided along end edges at the vehicle width direction inner side of the outer panel 24 of the rear wheel house 22. Penetrating holes and the like are not formed in the barrier wall 14. The barrier wall 14 is joined to the vehicle width direction inner side of the rear pillar 10 at a portion of the rear pillar 10. At a different portion not corresponding to the rear pillar 10, the barrier wall 14 is joined to the vehicle width direction inner side of the roof side inner panel 13.

As shown in FIG. 2, a lower end edge 13A of the roof side inner panel 13 is superposed with and joined to the vehicle width direction outer side of an upper end edge 14A of the barrier wall 14. This joining may be implemented using means such as rivet-joining or the like. The lower end edge 13A of the roof side inner panel 13 and the barrier wall 14 are sealed together by a sealant 34, assuring watertightness between the vehicle inside and the vehicle outside. Furthermore, the upper end edge 14A of the barrier wall 14 and the roof side inner panel 13 are sealed together by a sealant 36, assuring watertightness.

A rear end edge 14B of the barrier wall 14 is joined along, for example, end edges at the vehicle width direction outer side of the trough reinforcement 12 and lower back panel 20. The rear end edge 14B of the barrier wall 14 is also joined to be watertight at joining portions with other members (not shown in the drawings).

An aperture 40 is formed by the rear pillar 10, the trough reinforcement 12, the rear floor 26 and the rear wheel house 22. In the present exemplary embodiment, the aperture 40 is closed off by the barrier wall 14, assuring watertightness between the vehicle inner side and vehicle outer side thereof. A load-bearing wall (shear panel) is formed by the barrier wall 14.

The side panel 16 is provided at the vehicle outer side of the rear pillar 10, the trough reinforcement 12 and the barrier wall 14, constitutes a design surface of the vehicle side portion and is, for example, a resin member. Clip attachment portions 16A are provided at the vehicle inner side face of the side panel 16. Clips 38 are attached to the clip attachment portions 16A. The clips 38 are tightly fitted into the clip-fitting portions 27. Thus, the side panel 16 can be attached to the vehicle side portion. In the present exemplary embodiment, the barrier wall 14 divides the vehicle inside from the vehicle outside and is watertight. Therefore, there is no need to assure watertightness at the side panel 16. As a result, the side panel 16 is not limited to being a metal member; a resin member that is lighter in weight may be employed.

Operation

The present exemplary embodiment is configured as described above; operations thereof are described below. At the vehicle inner side of the rear pillar 10 in the vehicle rear portion structure S according to the present exemplary embodiment in FIG. 1 and FIG. 2, the barrier wall 14 is joined, to be watertight, to the rear pillar 10 and to the trough reinforcement 12 and roof side inner panel 13 extending in the vehicle front-and-rear direction. The barrier wall 14 divides the vehicle inner side from the outer side thereof. Because watertightness of the barrier wall 14 is assured, there is no need to assure watertightness at the side panel 16 constituting the design surface of the vehicle side portion. Therefore, the material, design and the like of the side panel 16 are subject to fewer limitations.

In a case in which, for example, the side panel 16 is converted to resin, a reduction in weight of the vehicle is possible and freedom of design of the side panel may be improved. Because the side panel 16 is a structure that is retained at the vehicle by clips, replacement of the side panel 16 is easy during maintenance of the vehicle or the like.

A load-bearing wall (a shear panel) is formed by joining the barrier wall 14 to the rear pillar 10 and to the trough reinforcement 12 and roof side inner panel 13 that extend in the vehicle front-and-rear direction. Therefore, stiffness of the vehicle is improved.

Second Exemplary Embodiment

Figure 3:
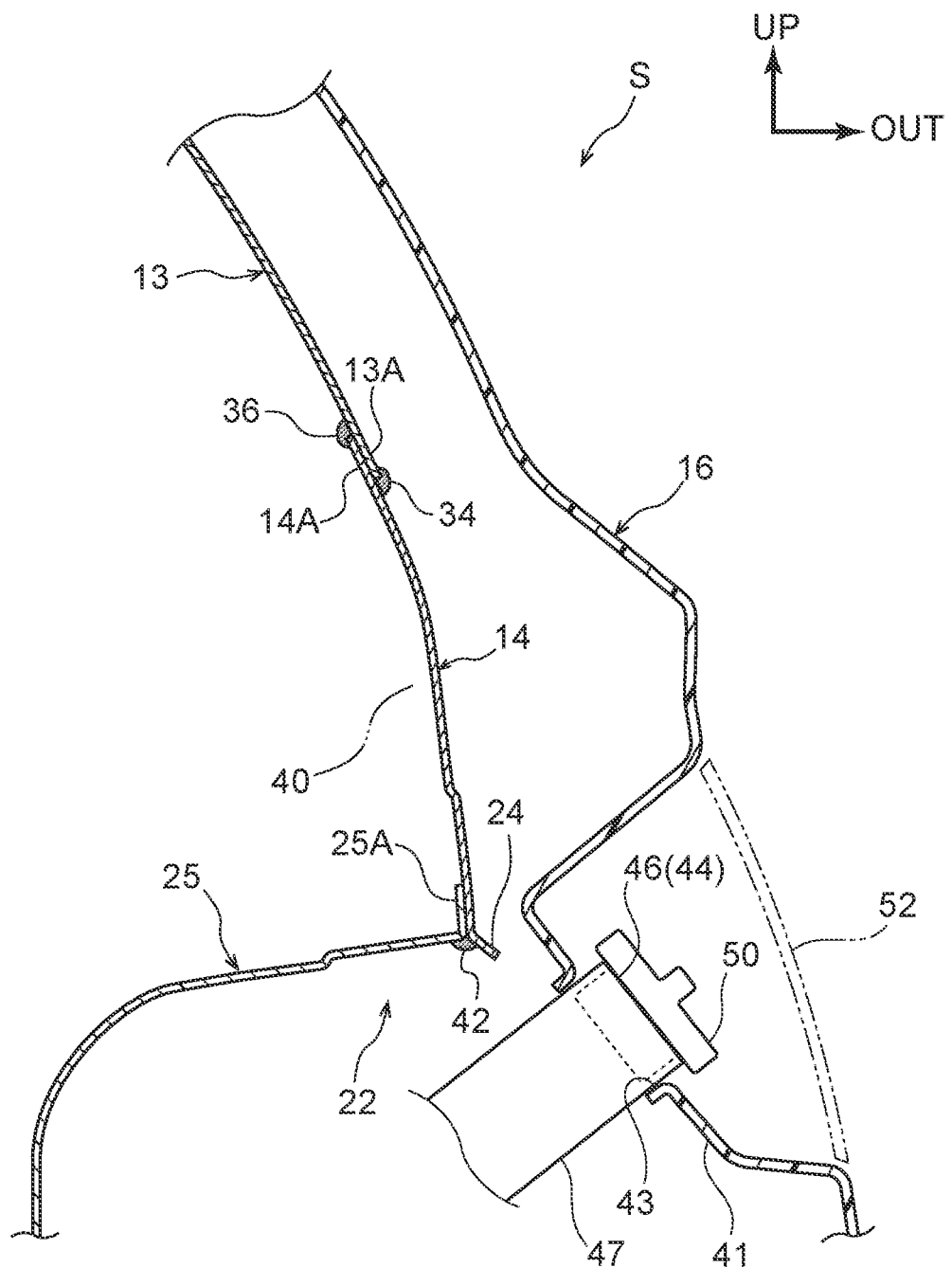
FIG. 3 is a sectional diagram in a case in which a vehicle rear side portion vicinity of a rear wheel house in FIG. 1, relating to a vehicle rear portion structure according to a second exemplary embodiment, is cut in the vehicle vertical direction.

FIG. 3 is a sectional diagram in a case in which a vehicle rear portion structure S according to the present exemplary embodiment is cut in the vehicle vertical direction in a vehicle rear side portion vicinity of the rear wheel house 22 in FIG. 1. In the vehicle rear portion structure S in FIG. 3, an inlet box portion 41 in a recess shape is provided in the side panel 16, and an inlet portion 44 is provided in the inlet box portion 41. The side panel 16 and the inlet box portion 41 are integrally formed of, for example, a resin. A penetrating hole 43 is formed in the inlet box portion 41. The inlet portion 44 may be inserted through the penetrating hole 43. The side panel 16 and the inlet box portion 41 may be integrally formed of a metal. A lid 52 is provided at the inlet box portion 41. The lid 52 covers the inlet box portion 41 in a case in which the inlet portion 44 is not being used.

The inlet portion 44 is, for example, a filler inlet 46, an electricity receiving portion to which a charging cable is to be connected (not shown in the drawings) or the like. If the inlet portion 44 is the filler inlet 46, the filler inlet 46 may be provided at the upper end of a filler pipe 47, or may be provided at piping that is connected to an upper end of a filler pipe (not shown in the drawings). Whatever the filler pipe, the filler pipe does not pass through to the vehicle inside, which would require that watertightness be assured; the filler pipe passes along at the vehicle outside to reach a fuel tank (not shown in the drawings). A cap member 50 is attachable to and detachable from the filler inlet 46. The filler inlet 46 may be fabricated of metal and may be fabricated of resin.

If the inlet portion 44 is an electricity receiving portion, the electricity receiving portion is connected with a charging device by a high-voltage cable (not shown in the drawings). A casing of the electricity receiving portion (not shown in the drawings) may be fabricated of metal and may be fabricated of resin.

In the present exemplary embodiment, similarly to the first exemplary embodiment, because the watertightness of the barrier wall 14 is assured, there is no need to assure watertightness of the side panel 16 that constitutes a design surface of the vehicle side portion. The recess-shaped inlet box portion 41 is provided at the side panel 16, and the inlet portion 44 is provided at the inlet box portion 41. Therefore, there is no need to assure watertightness between the side panel 16 and the inlet box portion 41, or between the inlet box portion 41 and the inlet portion 44. That is, no sealing structures for assuring watertightness are required at the periphery of the inlet portion 44. Therefore, structures may be simplified. In consequence, the vehicle may be further reduced in weight and assembly steps may be eliminated.

Because the side panel 16 and the inlet box portion 41 are formed integrally, structures may be simplified compared to a case in which the inlet box portion 41 is a separate body and is assembled to the side panel 16 (see the third exemplary embodiment described below).

If the side panel 16, the inlet box portion 41 and the inlet portion 44 are fabricated of resin, then in a case in which there is a collision at the vehicle rear portion, transmission of a load from the side panel 16 to the inlet box portion 41 and the inlet portion 44 is suppressed. As a result, excessive deformation of the inlet portion 44 during a collision at the vehicle rear portion may be inhibited. As a further consequence, structures may be simplified, such as various protectors, reinforcement brackets and the like being eliminated. Therefore, a further reduction in weight of the vehicle is possible.

Other portions are similar to the first exemplary embodiment. Portions that are the same are assigned the same reference symbols in the drawings and are not described.

Third Exemplary Embodiment

Figure 4:
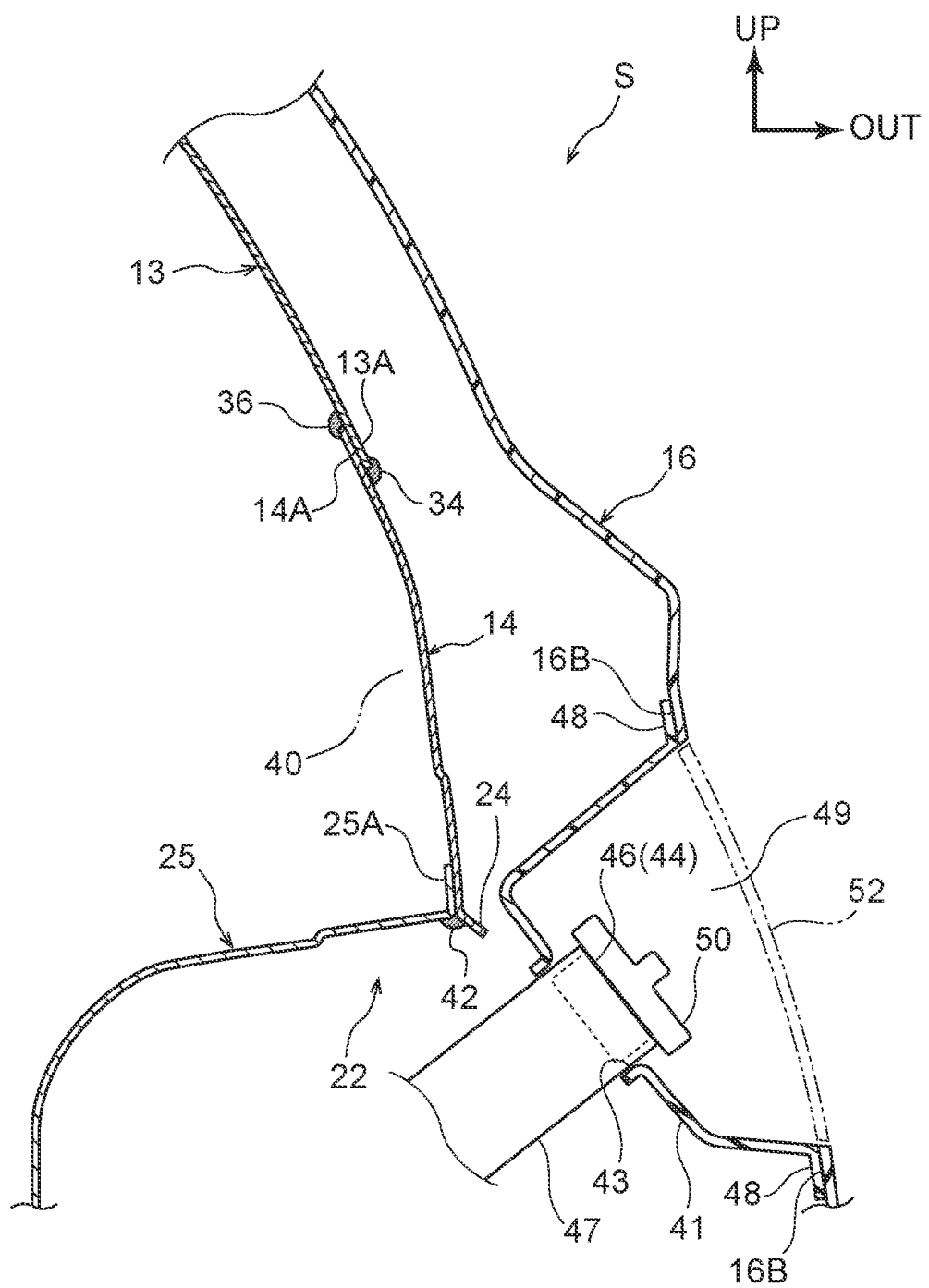
FIG. 4 is a sectional diagram in a case in which a vehicle rear side portion vicinity of a rear wheel house in FIG. 1, relating to a vehicle rear portion structure according to a third exemplary embodiment, is cut in the vehicle vertical direction.

FIG. 4 is a sectional diagram in a case in which a vehicle rear portion structure S according to the present exemplary embodiment is cut in the vehicle vertical direction in a vehicle rear side portion vicinity of the rear wheel house 22 in FIG. 1. In the vehicle rear portion structure S in FIG. 4, the inlet box portion 41 is a separate body and is assembled to the side panel 16. The side panel 16 and the inlet box portion 41 are, for example, both constituted of resin. A flange 48 is formed integrally with the inlet box portion 41. An opening portion 49 that corresponds with the inlet box portion 41 is provided at an attachment region of the side panel 16 at which the inlet box portion 41 is attached. The flange 48 of the inlet box portion 41 is joined to a back face 16B (vehicle inner side face) of peripheral edges of the opening portion 49.

Because the side panel 16 and the inlet box portion 41 are separate bodies from one another before assembly, the side panel 16 and the inlet box portion 41 may be formed of respectively different materials. For example, the side panel 16 may be fabricated of metal and the inlet box portion 41 fabricated of resin. Further, both the side panel 16 and the inlet box portion 41 may be fabricated of metal, or the side panel 16 may be fabricated of resin and the inlet box portion 41 fabricated of metal. In a case in which the inlet box portion 41 is being fixed to the side panel 16, arbitrary means such as bonding, adhesion, welding, fastening or the like may be employed.

In the present exemplary embodiment, because the side panel 16 and the inlet box portion 41 are separate bodies from one another before being assembled, the respective materials thereof may be arbitrarily selected and combined.

Other portions are similar to the first exemplary embodiment and the second exemplary embodiment. Portions that are the same are assigned the same reference symbols in the drawings and are not described.

Fourth Exemplary Embodiment

Figure 5:
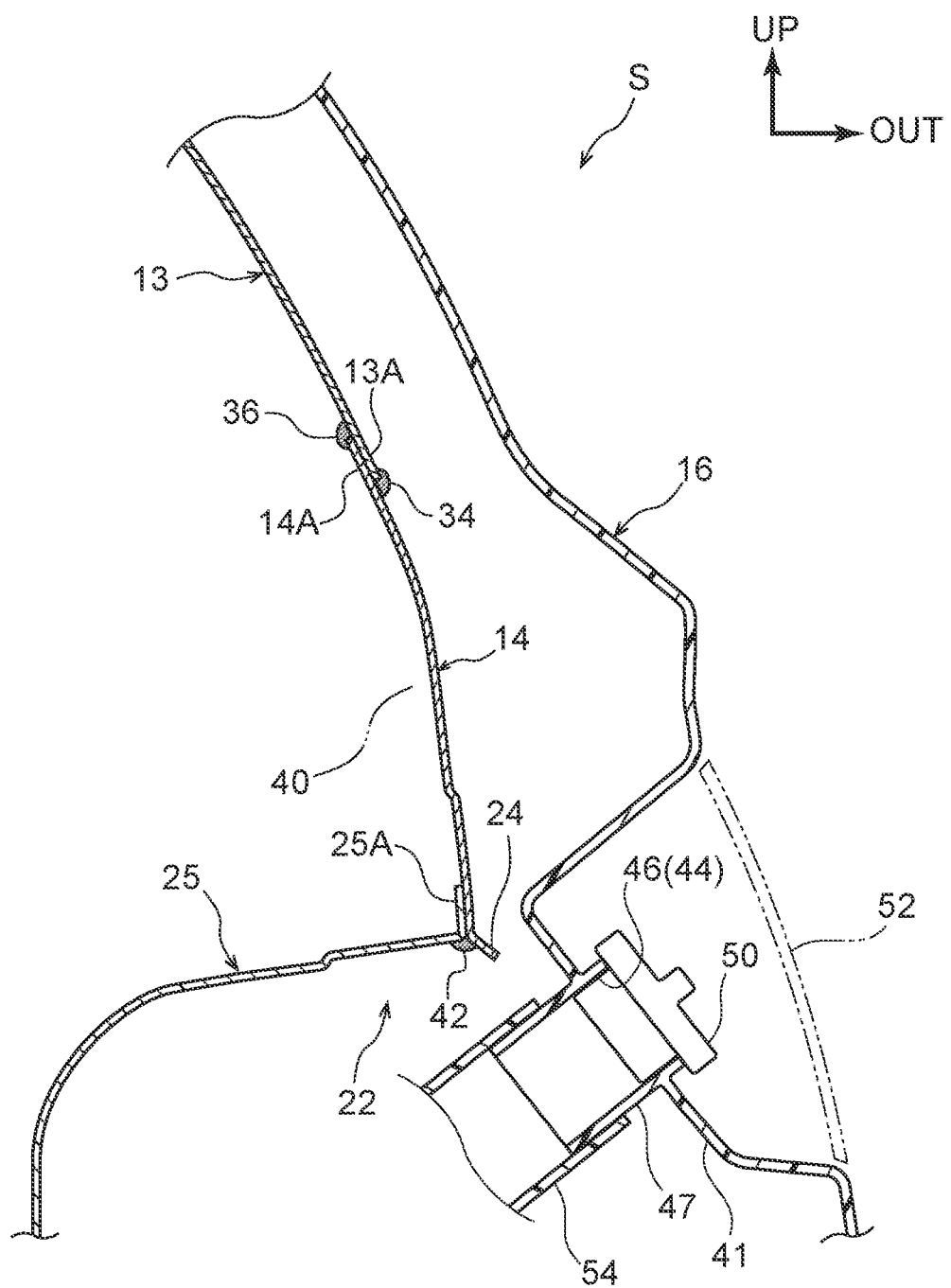
FIG. 5 is a sectional diagram in a case in which a vehicle rear side portion vicinity of a rear wheel house in FIG. 1, relating to a vehicle rear portion structure according to a fourth exemplary embodiment, is cut in the vehicle vertical direction.

FIG. 5 is a sectional diagram in a case in which a vehicle rear portion structure S according to the present exemplary embodiment is cut in the vehicle vertical direction in a vehicle rear side portion vicinity of the rear wheel house 22 in FIG. 1. In the vehicle rear portion structure S in FIG. 5, the side panel 16, the inlet box portion 41 and the inlet portion 44 are formed integrally of resin. To be specific, the inlet portion 44 is the filler inlet 46, and the filler pipe 47 including the filler inlet 46 is formed of resin integrally with the side panel 16 and the inlet box portion 41. The filler pipe 47 is formed to be relatively short in consideration of formability, and is connected to a fuel tank (not shown in the drawings) via a connecting pipe 54 that is a separate body.

In the present exemplary embodiment, because the inlet portion 44 is integrally formed of resin in addition to the side panel 16 and the inlet box portion 41, the number of components is reduced and structures are further simplified. In consequence, assembly steps of the vehicle may be further eliminated.

Other portions are similar to the first exemplary embodiment and the second exemplary embodiment. Portions that are the same are assigned the same reference symbols in the drawings and are not described.

Alternative Embodiments

Examples of exemplary embodiments of the present disclosure are described hereabove, but embodiments of the present disclosure are not limited to the above. It will be clear that numerous modifications beyond the above descriptions may be embodied within a scope not departing from the gist of the present disclosure.

The trough reinforcement 12 and the roof side inner panel 13 are mentioned as framework members that extend in the vehicle front-and-rear direction. However, framework members are not limited thus but may include a pillar and the like.

The side panel 16 is a resin member. However, a member that is lighter than steel, such as an aluminium panel or the like, may be employed.

Any of the second to fourth exemplary embodiments may be combined as appropriate with the first exemplary embodiment. Furthermore, the structures of the second to fourth exemplary embodiments need not be included; the structures of the first exemplary embodiment alone may be included.

What is claimed is:

1. A vehicle rear portion structure comprising:
    a rear pillar extending in a vehicle vertical direction, the rear pillar having an uppermost portion directly joined to a rearmost edge of a roof side reinforcement;
    a framework member including:
        a front end joined to an upper portion of the rear pillar, and
        a rear end extending towards a vehicle lower side;
    a barrier wall disposed at a vehicle inner side of the rear pillar and joined to the rear pillar and the framework member so as to be watertight, the barrier wall dividing the vehicle inner side from a vehicle outer side; and
    a side panel disposed at the vehicle outer side of the rear pillar, the framework member, and the barrier wall, the side panel forming a design surface of an exterior vehicle side.

2. The vehicle rear portion structure according to claim 1, wherein the side panel is a resin member.

3. The vehicle rear portion structure according to claim 1, wherein:
    an aperture is formed by the rear pillar, the framework member, a rear floor, and a rear wheel house, and
    the aperture is closed off by the barrier wall.

4. The vehicle rear portion structure according to claim 1, further comprising:
    a recess-shaped inlet box portion disposed at the side panel; and
    an inlet portion disposed at the inlet box portion.

5. The vehicle rear portion structure according to claim 4, wherein the side panel and the inlet box portion are formed integrally.

6. The vehicle rear portion structure according to claim 4, wherein the side panel, the inlet box portion, and the inlet portion are each constituted of resin.

7. The vehicle rear portion structure according to claim 6, wherein the side panel, the inlet box portion, and the inlet portion are formed integrally of resin.

\* \* \* \* \*